Sept. 13, 1938.    T. WAITE    2,130,048
FEED SAVING TROUGH
Filed Sept. 3, 1936    2 Sheets-Sheet 1
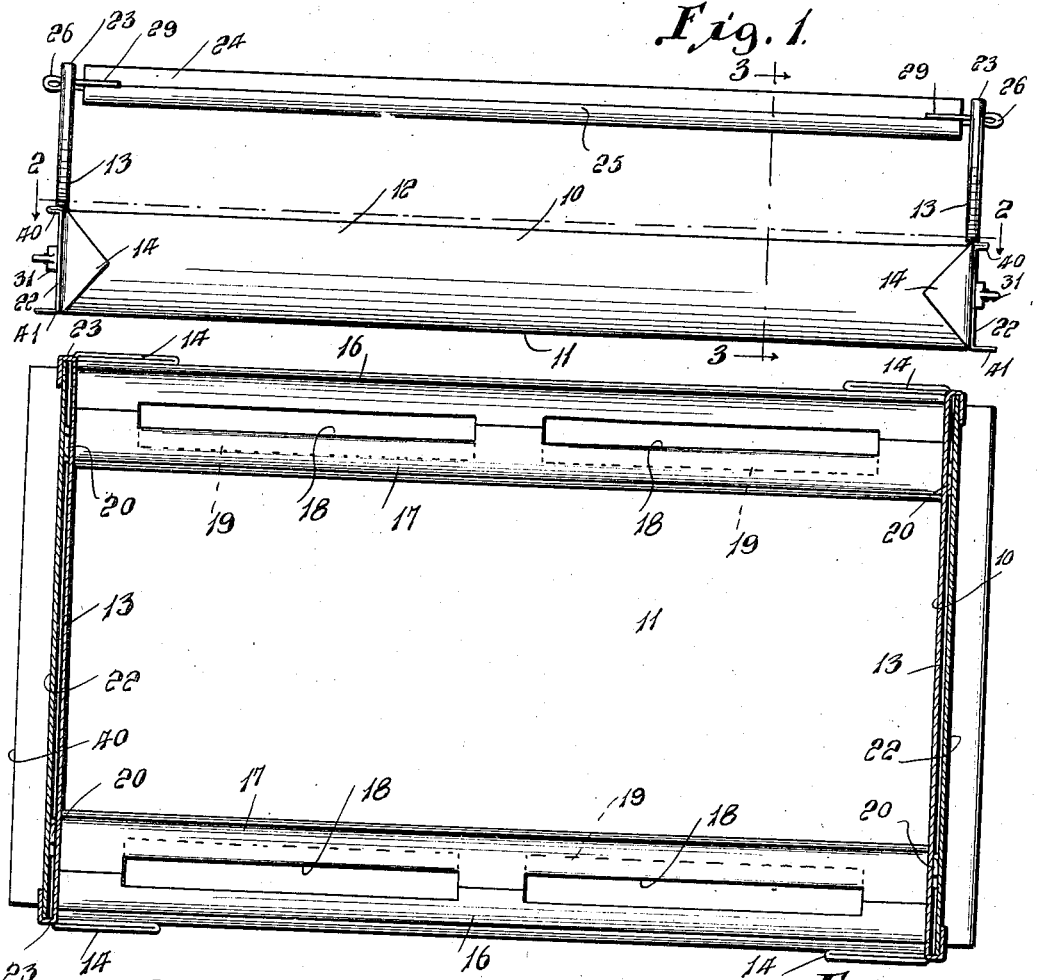
Fig. 1.
Fig. 2.
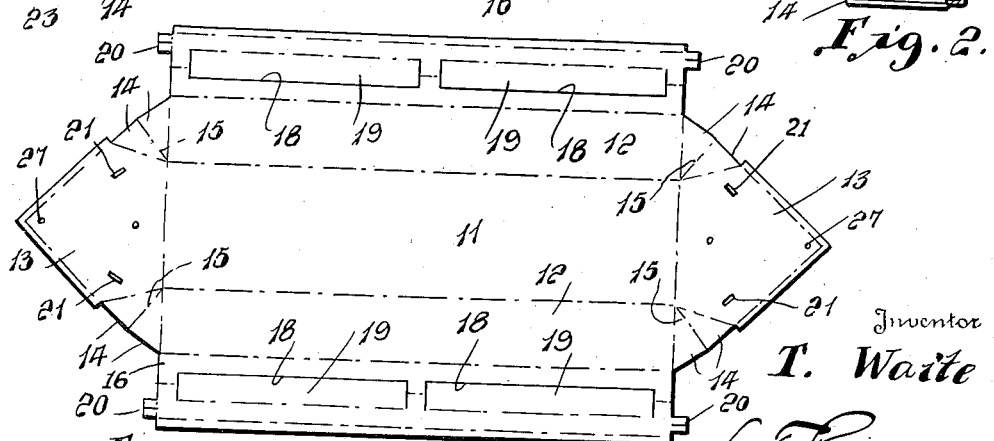
Fig. 6.
Inventor
T. Waite
By L. F. Randall
Attorney

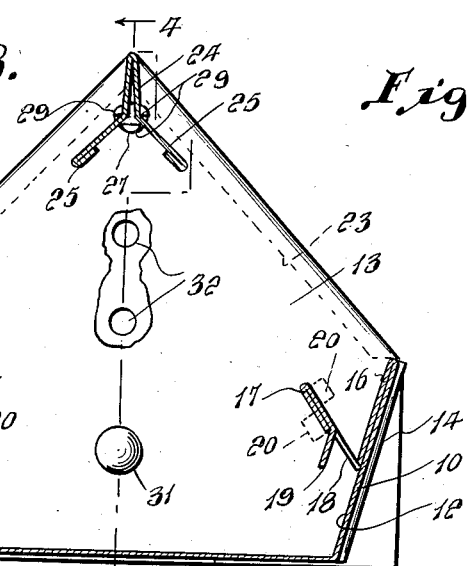

Patented Sept. 13, 1938

2,130,048

UNITED STATES PATENT OFFICE 2,130,048

FEED SAVING TROUGH

Thomas Waite, Pottstown, Pa.

Application September 3, 1936, Serial No. 99,284

4 Claims. (Cl. 119—61)

This invention relates to a feeding trough for animals generally but primarily adapted for use in feeding chickens or the like and to be made in sizes suitable for the different ages of poultry and it aims to provide a novel construction whereby the poultry cannot scatter the feed nor eject undesired portions thereof.

It is further aimed to provide a novel baffle strip as a feature adaptable for the interior of all kinds of feed troughs and hoppers to minimize the ejection or scattering of feed by the chickens or the like.

The more specific objects and advantages will become apparent from a consideration of the description following taken in connection with accompanying drawings illustrating operative embodiments.

In said drawings:

Figure 1 is a view of the trough in side elevation;

Figure 2 is a horizontal sectional view taken on the line 2—2 of Figure 1;

Figure 3 is a transverse sectional view taken on the line 3—3 of Figure 1;

Figure 4 is a vertical sectional view taken on the line 4—4 of Figure 3;

Figure 5 is a detail section taken on the line 5—5 of Figure 4;

Figure 6 is a plan view of the blank from which the trough is constructed;

Figure 7 is a fragmentary perspective view of a modified form of guard, and

Figure 8 is a detail cross sectional view illustrating a modified form of trough and baffle strip.

Referring specifically to the drawings, wherein like reference characters designate like or similar parts, a feed trough is provided at 10, preferably stamped from a single sheet of metal, cardboard or any other desired material, the form of the blank being shown in Figure 6. Such trough has a bottom 11, upwardly diverging side walls 12 and end walls 13. Such walls are bent along the dotted lines shown in Figure 6 and the portions 14 joining the walls are crowded and folded along lines 15.

Said side walls 12 have returned portions 16 and inwardly and upwardly extending baffle strips 17 provided with suitable openings 18 therethrough, which openings are provided by striking out the metal into depending guard flanges 19. It will be seen that the chickens or the like will obtain the feed within the trough beyond the baffle strips 17 and that what they bill out will fall back into the trough and hence they cannot unduly throw or scatter the feed or select certain portions thereof to the exclusion of the remainder. If flanges 19 were not provided, the feed would rapidly fill openings 18, pile onto flanges 17 and overflow the walls 14. At each filling of the trough, the attendant removes the feed below the plane of the openings 18 to the plane of the lower edge of guard flanges 19.

The baffle strips have lugs 20 at their ends, which are adapted to be passed through slots 21 in the end walls 13 and then upset.

At the ends, the trough is preferably supported by detachable vertical plates 22 and the end walls 13 have outwardly extending hook flanges at 23 which engage the upper edges of the plates 22, which latter are of the same shape as the end walls 13. Said plates 22 have horizontal portions, doubled and extending outwardly to provide gripping flanges at 40.

Across the top of the device a rotatable guard 24 is preferably provided, the same having any desired number of vanes 25. Such guard is held in place by pins 26, extending through and pivoted in openings 27 and 28 in the walls 13 and plates 22, respectively. The inner portions of such pins are split into three tines 29 to yieldably grasp the vanes 25 as best shown in Figure 3, to unitarily connect the guard and pins.

In lieu of the guard shown at 24, there may be provided an inverted V-shaped member as shown in Figure 7, said member comprising an open wire body as at 33, which has V-shaped portions 34, having their ends secured to rods 36 and 37. Body 33 is adapted to rest on the top edges of side walls 11 by having rods 36 and 37 engaging said wall edges, and if desired either of said rods may be pivoted to its supporting wall in any suitable manner.

Various changes may be made within the spirit and scope of the invention. For instance the baffle means according to the invention may be applied to wooden troughs as suggested in Figure 8. Such wooden trough is fragmentarily shown at 38 and the baffle has walls or flanges 39 and 40', engaging the upper and inner surfaces of the side walls of the trough. A baffle wall 41 extends inwardly and upwardly from the wall 40', being returned upon itself at a portion thereof and having openings functioning like those at 18, and depending flanges 42 functioning like those at 19. In other words, the parts 40', 41 and 42 correspond to the parts 16, 17 and 19, the baffle being similar in construction to that of the preceding figures with the exception that it is separate from the trough and secured thereto by means of the flange 39.

I claim as my invention:

1. In combination with a wall of a trough, a baffle extending upwardly and inwardly therefrom, said baffle being free at its inner edge and the trough being unobstructed thereabout to permit access to the feed inwardly of the baffle, said baffle having an opening therethrough close to said wall whereby billed feed may return to the trough, and a depending guard flange at the opening spaced from said wall.

2. In combination with a wall of a trough, a baffle extending upwardly and inwardly therefrom, said baffle having an opening therethrough whereby billed feed may return to the trough, and a wall extending downwardly from the top of the first mentioned wall and from which the baffle extends, said baffle being returned upon itself for a portion thereof and having a depending flange at said opening.

3. A trough of the class described having end walls, side walls, portions returned interiorly over the side walls having baffles extending upwardly and inwardly therefrom at a distance below the upper edges of said walls, said baffles having openings therethrough close to said walls to permit billed feed to return to the trough, and interlocking lugs between the end walls of the trough and said baffles, depending flanges on the baffles at said openings, end plates, said end plates having a series of openings therethrough, and bolts to connect said trough selectively to said openings.

4. A trough of the class described having end walls, side walls, portions returned interiorly over the side walls having baffles extending upwardly and inwardly therefrom, said baffles having openings to permit billed feed to return to the trough, interlocking lugs between the end walls of the trough and said baffles, end plates, said end plates having a series of openings therethrough, bolts to connect said trough selectively to said openings, a guard at the top of the trough secured to the end walls thereof, said end walls having outwardly extending hook flanges at their tops to engage said plates, said plates intermediate their ends being bent upon themselves to provide gripping portions and said plates having outwardly extending feet at their lower ends.

THOMAS WAITE.